(12) United States Patent
Forte et al.

(10) Patent No.: US 10,816,102 B2
(45) Date of Patent: Oct. 27, 2020

(54) EROSION RESISTANT STEAM VALVE

(71) Applicant: General Electric Company, Schenectady, NY (US)

(72) Inventors: Guido F. Forte, Schenectady, NY (US); David Ernest Welch, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 16/051,593

(22) Filed: Aug. 1, 2018

(65) Prior Publication Data

US 2020/0041016 A1  Feb. 6, 2020

(51) Int. Cl.
| | | |
|---|---|---|
| *F16K 25/04* | (2006.01) | |
| *F16K 1/38* | (2006.01) | |
| *F01D 17/14* | (2006.01) | |
| *F16K 25/00* | (2006.01) | |
| *F16K 1/36* | (2006.01) | |
| *F16K 1/32* | (2006.01) | |

(Continued)

(52) U.S. Cl.
CPC ............ *F16K 25/04* (2013.01); *F01D 17/145* (2013.01); *F16K 1/385* (2013.01); *F16K 25/005* (2013.01); *F05D 2220/31* (2013.01); *F05D 2300/13* (2013.01); *F05D 2300/132* (2013.01); *F05D 2300/133* (2013.01); *F16K 1/2263* (2013.01); *F16K 1/32* (2013.01); *F16K 1/36* (2013.01); *F16K 1/422* (2013.01); *F16K 27/02* (2013.01); *F16K 37/00* (2013.01)

(58) Field of Classification Search
CPC ........ F16K 25/04; F16K 25/005; F16K 1/422; F16K 1/2263; F16K 1/385; F16K 1/32; F16K 1/36; F16K 37/00; F16K 27/02; F05D 17/145; F05D 2220/31; F05D 2300/133; F05D 2300/13; F05D 2300/132; F01D 17/145
See application file for complete search history.

(56) References Cited

U.S. PATENT DOCUMENTS 4,114,652 A * 9/1978 Oberle ................. F01D 17/145
137/613
4,121,617 A * 10/1978 Masek ................. F01D 17/145
137/613

(Continued)

*Primary Examiner* — Jessica Cahill
*Assistant Examiner* — Patrick C Williams
(74) *Attorney, Agent, or Firm* — Charlotte C. Wilson; James W. Pemrick

(57) ABSTRACT

A steam valve includes a housing defining a steam inlet and steam outlet in fluid communication with a valve cavity, and an annular valve seat disposed within the valve cavity. A control valve is configured to selectively engage the valve seat. The steam valve further includes a stop valve configured to selectively engage the valve seat. The steam valve includes a pressure seal head configured to receive the stop valve. The pressure seal head includes an elongated body having a bore extending longitudinally through the body; and a nose piece extending from an end of the elongated body. The nose piece has at least a tapered end portion and a bore extending longitudinally therethrough. The bore of the nose piece is longitudinally with the bore of the elongated body. The nose piece is formed of a first material which has greater erosion properties than a second material forming the elongated body.

15 Claims, 5 Drawing Sheets

(51) Int. Cl.
*F16K 27/02* (2006.01)
*F16K 37/00* (2006.01)
*F16K 1/226* (2006.01)
*F16K 1/42* (2006.01)

(56) References Cited

U.S. PATENT DOCUMENTS

| | | | | |
|---|---|---|---|---|
| 4,384,593 A | * | 5/1983 | Keller | F16K 47/02 |
| | | | | 137/625.3 |
| 2007/0169817 A1 | * | 7/2007 | Nigliazzo | F16K 31/025 |
| | | | | 137/198 |
| 2016/0025231 A1 | * | 1/2016 | Watanabe | F16K 5/0636 |
| | | | | 251/279 |
| 2017/0107844 A1 | * | 4/2017 | Passino, Jr. | F01D 25/005 |

* cited by examiner

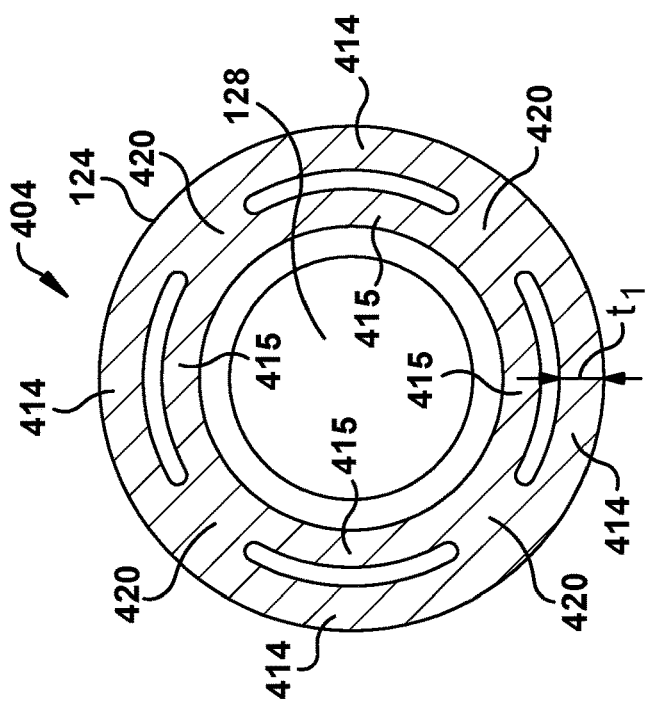
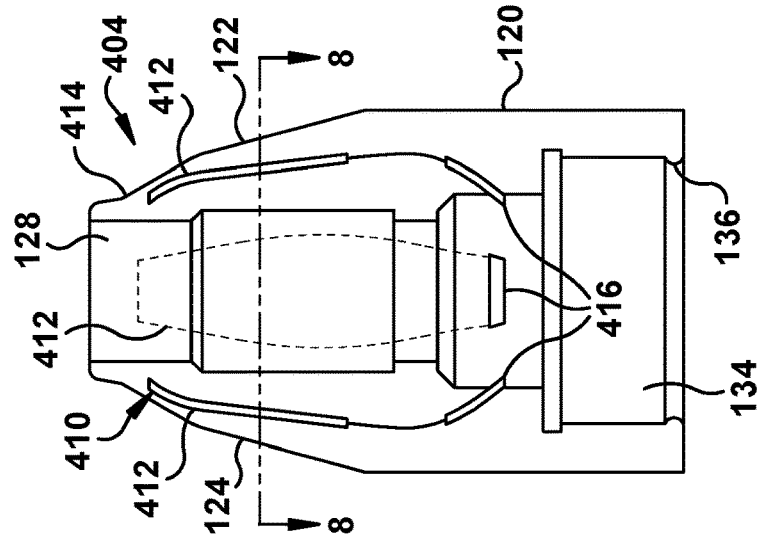
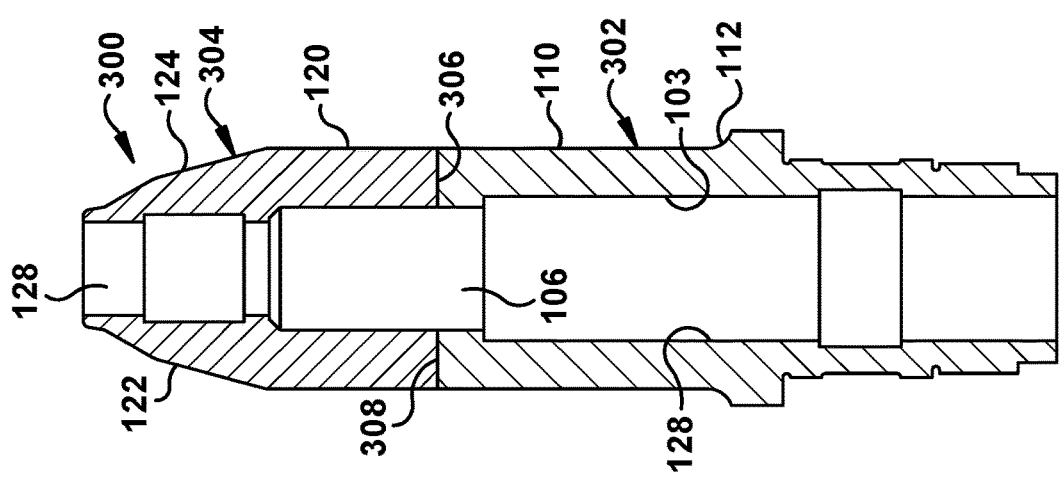

EROSION RESISTANT STEAM VALVE

BACKGROUND

The present subject matter relates generally to a steam valve for a steam turbine, or more particularly, to a steam valve having an erosion resistant pressure seal head (i.e., valve stem guide).

Solid particle erosion is a common problem affecting steam power production components in the power generation industry. Many parts of the steam path between the power boiler and steam turbine are subject to material erosion problems due to entrained magnetite particles exfoliated from boiler tubes into the steam transport system. Over time, erosion damage can accumulate and impact steam piping integrity, valve operation, steam turbine blades, etc. resulting in a loss of plant efficiency, as well as lower reliability and availability due to increase forced outages to repair damaged components. Ultimately, the plant owner will recognize an increasing loss in revenues and profitability.

Steam valves can experience extreme erosion conditions, particularly when the steam valve opens and closes. As shown in FIG. 1, a known steam valve, generally designated 10, has a steam valve body 12 having an internal cavity 13, a steam inlet 14, a steam outlet 16, a control valve 17 including a control valve head 18, and a stop valve 19 including a stop valve head 20. Above the control valve 18, a control valve actuator (not shown) is coupled to a stem 36 for raising and lowering the control valve head 18 to selectively engage a valve seat 21 for controlling the steam flow through the valve 10. It will be appreciated that the position of the flow control head 18 relative to the valve seat 21 can be controlled in response to load changes on a turbine.

The control head 18 is annular in configuration, having a hollow or recess 40 along its underside. The annular lower edge of control valve head 18 in a closed position, as shown in FIG. 1, engages and seals against the valve seat 21. The stop valve head 20 is configured for reception within the recess 40 and also includes an annular surface 41 about its underside for sealing and engaging against the valve seat 21 in a stop valve closed position. The stop valve head 20 is mounted on a shaft or stem 44 which extends through a pressure seal head 35 to a hydraulic cylinder (not shown). The stop valve head 20 follows the movement of the control valve head 18 through a control system (not shown). By following the movement of the control valve 17, the combination of the control valve head 18 and stop valve head 20 provide a smooth, laminar flow of steam past those heads and through the valve to the outlet 16.

FIG. 2 illustrates both the control valve head 18 and stop valve head 20 of FIG. 1 in an open position. Below the control valve head 18 and the stop valve head 20, an outlet passage 50 is provided which directs the flow of steam passing through the valve to the outlet 16. The outlet passage 50 and the valve seat 21 have walls substantially forming a smooth, continuous transition therebetween without any abrupt changes in flow direction. In this manner, the steam flowing through the valve 10 past the valve seat 21 and through the outlet passage 50 to the outlet 16 is substantially without vortices and affords optimum steam flow characteristics, with minimum losses. Moreover, the outlet passage 50 has a cross-sectional area which is not substantially larger than the cross-sectional area of the valve seat 21 and the outlet 16. Thus, the pattern of steam flow in the valve-open condition tends toward a laminar flow without substantial vortices and, consequently, with minimum head losses. This laminar flow may include entrained solid particles that when passing through the outlet passage, impinge upon the upper tip of the pressure seal head 35 resulting in severe erosion.

Referring to FIG. 3, a schematic view of the steam valve 10 in a partially open position shows a high velocity annular steam flow 54 passing between the control valve head 18 and the valve seat 21, particularly when the spacing therebetween is narrow such as during the transition period when the control valve seat 18 or stop valve head 20 is lifting from or engaging the valve seat 21. During this transition time or valve position, the high velocity steam 54 annularly impacts the tip of the pressure seal heat 35, for example, at area 42. One will appreciate any particle entrained in the steam flow 54 will increase erosion of the pressure seal head 35 at this area 42.

As such, it is desirable to provide a means to reduce the erosion of the pressure seal head of a steam valve.

BRIEF DESCRIPTION

Aspects and advantages will be set forth in part in the following description, or may be obvious from the description, or may be learned through practice of the invention.

In one aspect, the present disclosure is directed to a pressure seal head of a steam valve including an elongated body having a bore extending longitudinally through the body, and a nose piece extending from an end of the elongated body. The nose piece has at least a tapered end portion and a bore extending longitudinally therethrough. The nose piece is configured to longitudinally aligned the bore of the nose piece with the bore of the elongated body. The nose piece is formed of a first material which has greater erosion properties than a second material forming the elongated body In another aspect, the present disclosure is directed to a steam valve includes a housing defining a steam inlet and steam outlet in fluid communication with a valve cavity, and an annular valve seat disposed within the valve cavity. A control valve having a valve head coupled to a control valve stem is configured to selectively engage the valve seat. The steam valve further includes a stop valve, having a stop valve head, and a stop valve stem coupled to the stop valve head. The stop valve is configured to selectively engage the valve seat. The steam valve includes a pressure seal head configured to receive the stop valve stem. The pressure seal head includes an elongated body having a bore extending longitudinally through the body; and a nose piece extending from an end of the elongated body. The nose piece has at least a tapered end portion and a bore extending longitudinally therethrough. The nose piece is configured to longitudinally align the bore of the nose piece with the bore of the elongated body. The nose piece is formed of a first material which has greater erosion properties than a second material forming the elongated body In another aspect, the present disclosure is directed to a nose piece of a pressure seal head of a steam valve. The nose piece includes at least a tapered end portion and a bore extending longitudinally therethrough and configured to longitudinally aligned with a bore of an elongated body of the pressure seal head. The nose piece is configured to removably and replaceably attach to then elongated body of the pressure seal.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which:

FIG. 6 is a cross-sectional view of another embodiment of a pressure seal head for the steam valve of FIG. 1 in accordance with an exemplary embodiment of the present invention;

FIG. 7 is a cross-sectional view of another embodiment of the nose piece of FIG. 4 in accordance with an exemplary embodiment of the present invention; and.

FIG. 8 is a cross-sectional view of the nose piece of FIG. 7 taken along the dashed line 8-8 in accordance with an exemplary embodiment of the present invention.

Figure 1:
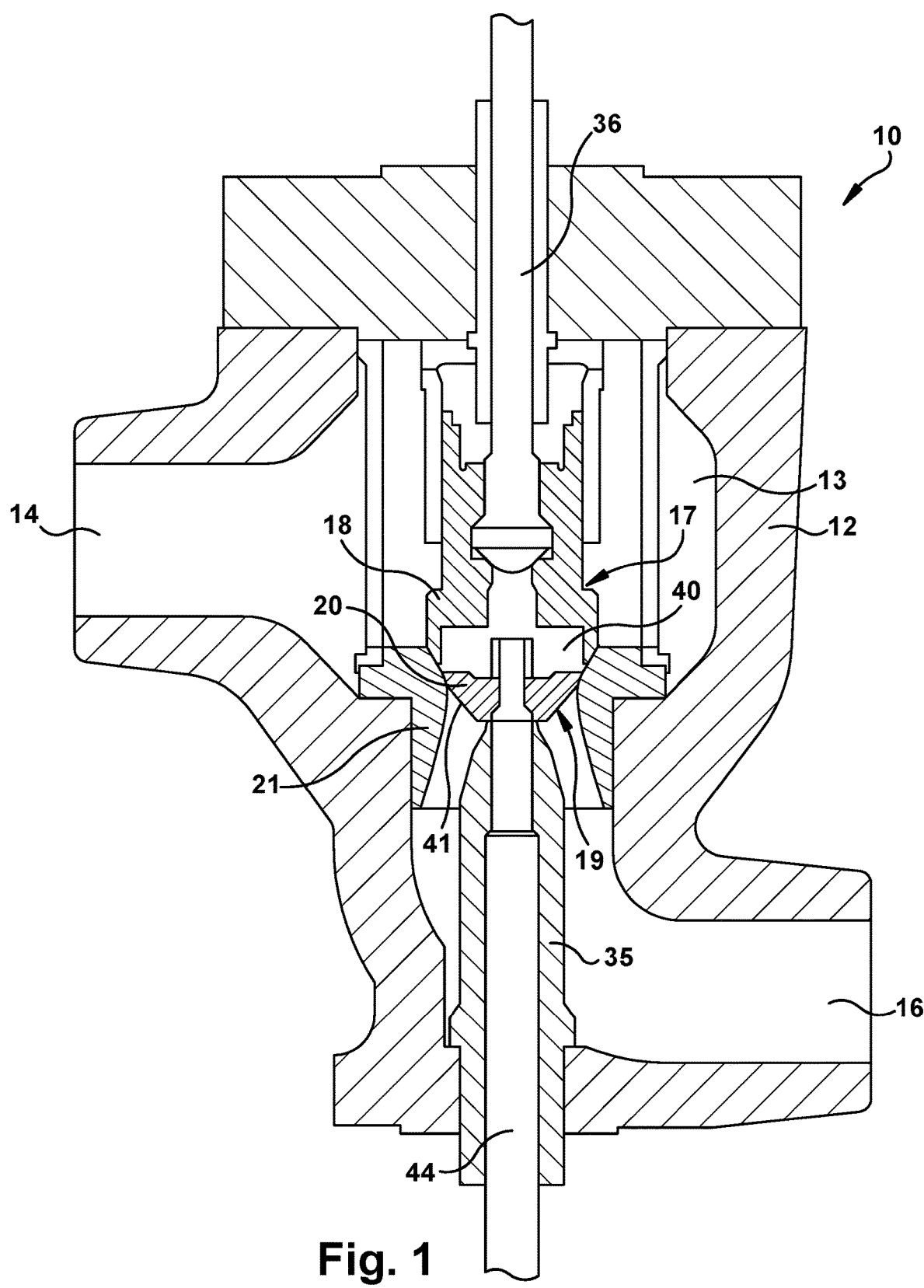
FIG. 1 is a fragmentary view of a known steam valve.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "upper", "lower", "upward", and "downward" refer to the relative position of features of a component or direction with respect to its orientation in the illustration of the component and are not intended to signify orientation of the features or direction during the use of the components.

The terms "integral" and "unitary" refer to at least two components which are metallurgically joined or formed together, such that the separation of the components is not easily performed without damaging a component.

The terms "coupled", "fixed", "attached to", "secure", and the like refer to both direct coupling, fixing, or attaching, as well as indirect coupling, fixing, or attaching through one or more intermediate components or features, unless otherwise specified herein.

Figure 4:
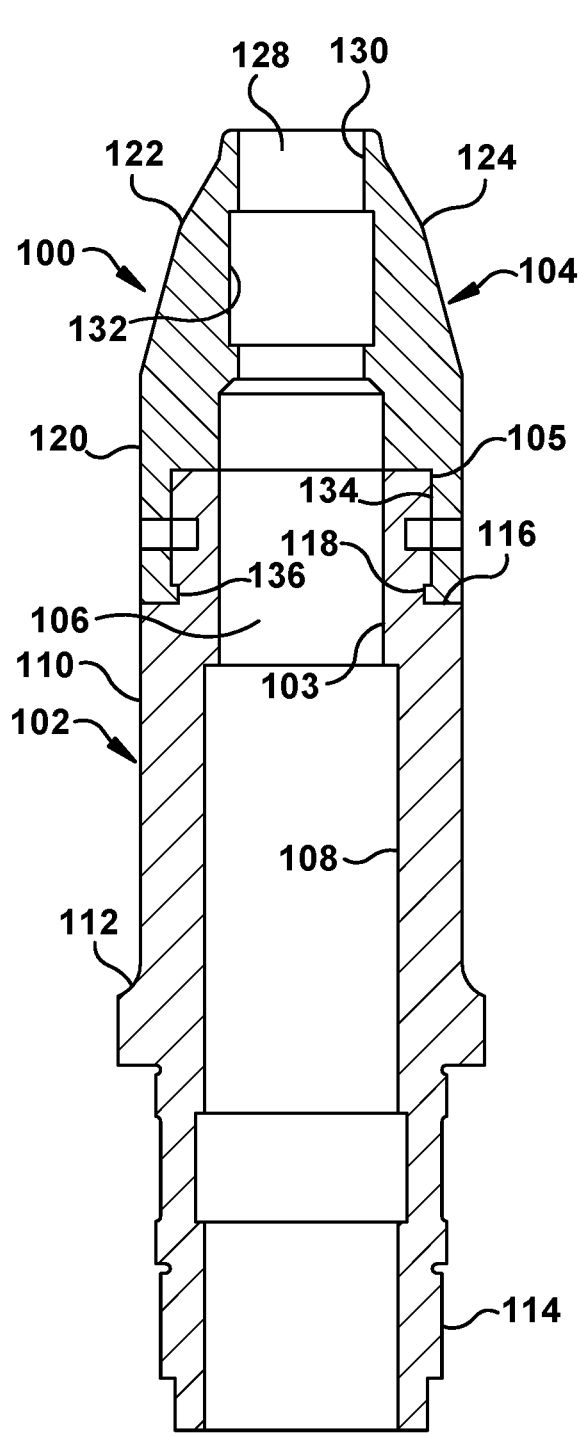
FIG. 4 is a cross-sectional view of an embodiment of a pressure seal head for the steam valve of FIG. 1 in accordance with an embodiment of the present invention.

FIG. 4 shows an exemplary embodiment of a pressure seal head 100 of the present invention for use in the steam valve 10 of FIG. 1. The pressure seal head 100 includes a body 102 and a nose piece 104 attached to the body to enable the nose piece to be removed and replaced without damaging the body. The nose piece 104 is formed of high erosion resistant material such as a high chromium alloy, cobalt based alloy, cobalt/chromium alloy, tungsten alloy, titanium alloy or any other high erosion resistant material. For example, the nose piece 104 may be formed of Stellite 6B. The body 102 may be formed of the same or similar material as the nose piece 104, however, to reduce costs, the body may be formed of a material having less erosion resistant characteristics than the material of the nose piece, such as a low chromium alloy, for example.

The body 102 may be generally cylindrical in shape having a bore 106 passing longitudinally or axially through the body for slidably receiving the stem 44 of the stop valve 19 of FIG. 1. The bore 106 defines an inner surface 103 of the body 102 having a recess 108 to accommodate a sleeve bushing (not shown) to provide a bearing surface for the stem 44. The body 102 includes an annular ridge 112 extending from the outer surface 110 for engaging the housing 12 (as best shown in FIG. 1) to provide support and a stop to ensure the body extends within the internal cavity 13 of the steam valve 10 at a desired height. A lower end 114 of the body 102 is configured to extend into and/or through a bore in the housing 12. The upper end 105 of the body 102 has an outer diameter less than the outer diameter of the outer surface 110 to provide an annular step 116, which may provide a seat for the nose piece 104. At the step 116, the upper end 105 of the body 102 may include an annular groove 118 for engaging the nose piece 104.

The nose piece 104 may be shaped to include a lower portion 120 having a generally cylindrical shape and a generally tapered upper portion 122. The outer diameter or shape of the lower portion 120 may be substantially the same as the outer surface 110 of the body 102 to provide a relatively smooth transition therebetween. The outer surface 124 of the tapered portion 122 of the nose piece 104 may be arcuate, rounded, flat or any other characteristic to provide the desired aerodynamic profile for engaging the steam flow 54 (FIG. 3) passing over the pressure seal head 100. As shown in FIG. 4, the tapered upper portion 122 of the nose piece 104 may have a rounded, convex surface 124. The nose piece 104 includes a bore 128 that defines an inner surface 130 of the nose piece and that passes longitudinally or axially therethrough for slidably receiving the stem 44 of the stop valve 19. The bore 106 of the nose piece 104 includes a recess 132 to accommodate a sleeve bushing (not shown) to provide a bearing surface for the stem 44. The lower portion 120 of the nose piece 104 includes a counterbore 134 having a diameter that is substantially equal to or less than the outer diameter of the upper end 105 of the body 102 for receiving the body therein. The lower end 120 within the counter bore 134 may include an annular ridge 136 extending inwardly having a complimentary shape as the groove 118 in the body.

As best shown in FIG. 4, the nose piece 104 may be attached to the body 102 by shrink fitting the nose piece to the body whereby the nose piece fits over the upper end 105 of the body and the annular ridge 136 of the noise piece locks into the groove 118 of the body to form the pressure seal head 100. To further secure the nose piece 104 to the body 102, at least one pin 140 may extend through a through hole in the nose piece into a hole in the upper end 105 of the body 102. The invention also contemplates the nose piece 104 providing no annular ridge 136 nor the body 102 providing a groove 118, whereby the nose piece 104 is simply secured to the body 102 by the at least one pin 140, which is removable. The invention further contemplates that one to four pins 140 may be used to secure the nose piece 104 to the body 102 to form the pressure seal head 100.

Figure 5:
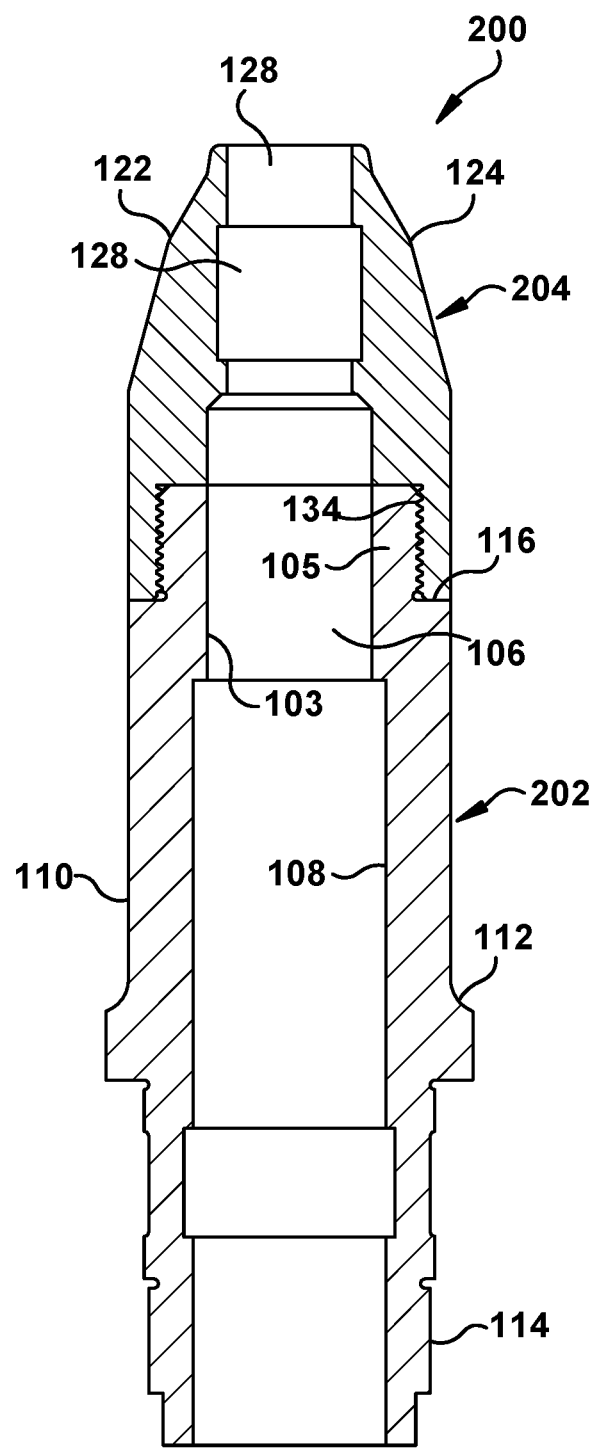
FIG. 5 is a cross-sectional view of another embodiment of a pressure seal head for the steam valve of FIG. 1 in accordance with an exemplary embodiment of the present invention.

In another exemplary embodiment in FIG. 5, a pressure seal head 200 is shown, which is similar to the pressure seal head 100 of FIG. 4, and therefore, the common features will have the same reference number and characteristics. The primary difference between the pressure seal head 200 and the pressure seal head 100 is the means to attach the nose piece to the body to enable removal and/or replacement of the nose piece. In this embodiment, both the outer surface of the upper portion 105 of the body 202 and the inner surface of the counterbore 134 of the lower portion 120 of the nose piece 104 are threaded. The nose piece 204 and the body 202 are threaded together to secure these components together. These attachment means shown in FIGS. 4 and 5 enable the nose piece 104, 204 to be removed from the body 102, 202 and replaced with a new nose piece without damaging the body of the pressure seal valve 100, 200.

While the attachment means shown in FIGS. 4 and 5 provide features to insert and attach the body 102, 202 into the nose piece 104, 204, the present invention contemplates these attachment features may be reversed whereby the nose piece 104, 204 and the body 102, 202 are attached together by inserting the nose piece into the body, such that the nosepiece 104, 204 includes the male portion of the attachment and the body 102, 202 includes the female portion. For example, the upper portion 105 of the bodies 102, 202 may include a counterbore similar to the counterbore 134 of the respective nose piece 104, 204 of FIGS. 4 and 5, while the lower portion 120 of the nose pieces 104, 204 may include a lower end with an outer diameter less than the outer diameter of the outer surface of the nose piece 104, 204 to provide an annular step similar to the upper end 105 of the respective bodies 102, 202 of FIGS. 4 and 5. This alternative embodiment for the pressure seal head 100 of FIG. 4 may include a complementary annular ridge and groove to attach the nose piece into the body. Similarly, this alternative embodiment for the pressure seal head 200 of FIG. 5 may include threaded surfaces on the lower end of the nose piece and the counterbore of the body to thread and secure the nose piece into the body. Furthermore, while the noise piece 104, 204 and body 102, 202 are described as having a generally cylindrical shape or circular cross-section, one will appreciate the shape or cross-section may include any shape or cross-section, for example any hexagonal shape.

Referring to FIG. 6, another embodiment of a pressure seal head 300 according to the present invention is shown, which is similar to the pressure seal heads 100, 200 of FIGS. 4 and 5, respectively, and therefore, the common features will have the same reference number and characteristics. The pressure seal head 300 includes a body 302 and a nose piece 304 fixedly attached together. Similar to the pressure seal heads 100, 200, the nose piece 304 is formed of high erosion resistant material, while the body may be formed may be formed of a material having less erosion resistant characteristics than the material of the nose piece, such as a low chromium alloy, for example.

The primary difference between the pressure seal head 300 and the pressure seal heads 100, 200 is the means to attach the body 302 and nose piece 304 together. The body 302 and the nose piece 304 may be formed or joined together to form an integral or unitary component by various attachment methods or means, such as conventional brazing or welding (e.g., inertia welding) attachment methods. Alternatively, the nose piece 304 and body 302 may be formed as a unitary component by molding or additive manufacturing methods, including dissimilar additive manufacturing methods. As shown, the nose piece 304 and body 302 provide complementary flat engagement surfaces 306, 308 respectively, to provide a planar transition between the components. While the engagement surfaces are flat, one will appreciate the engagement surfaces by provide complementary interlocking features. For example, the upper end of the body 302 may extend into a complementary bore within the nose piece 304, or vice versa. In this embodiment, the non-destructive removal and replacement of the nose piece 304 from the body 302 is not simple nor economical, and therefore, replacement of entire pressure seal head 300 is the most practicable.

Figure 2:
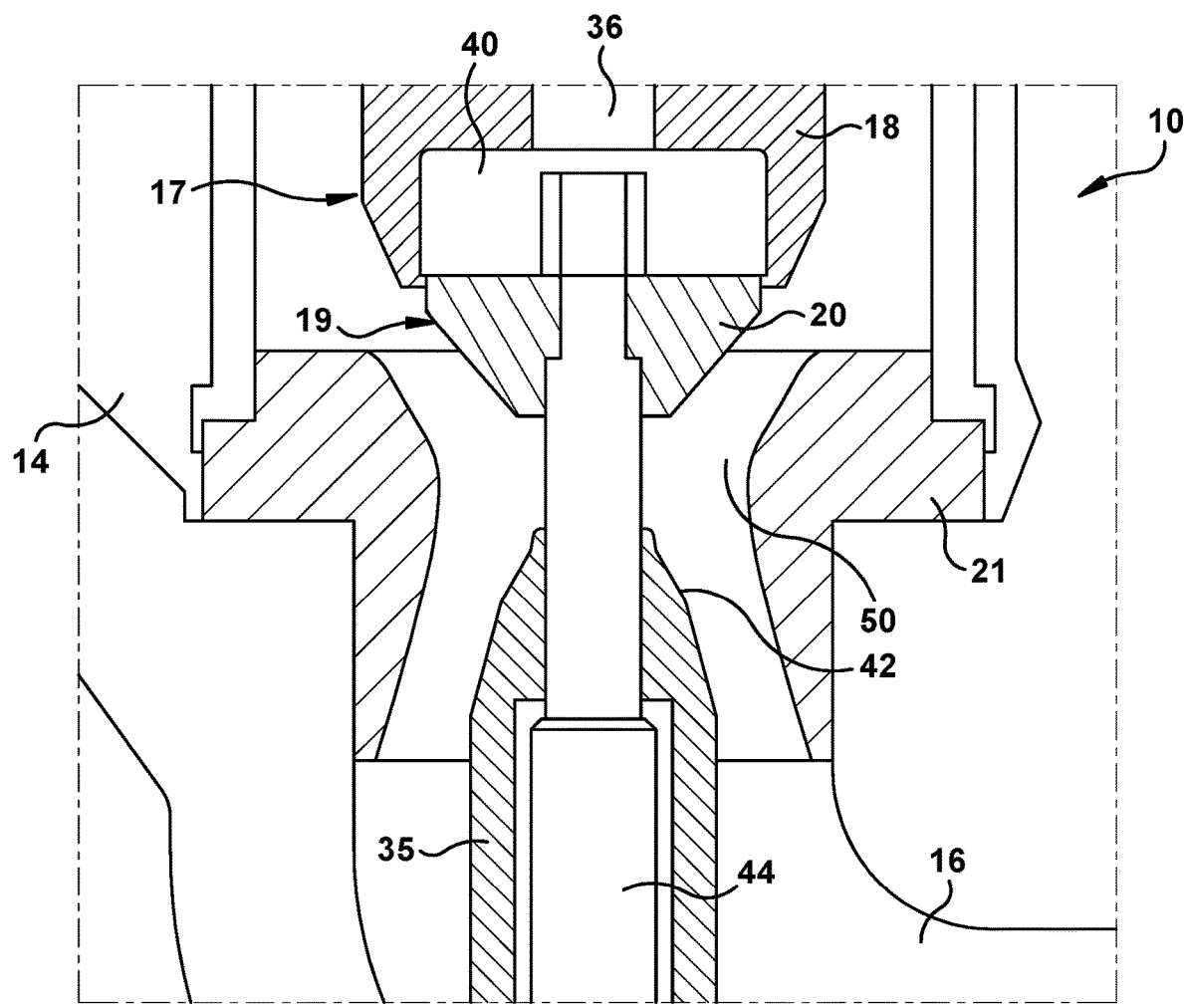
FIG. 2 is an expanded cross-sectional view of the steam valve of FIG. 1.
Figure 3:
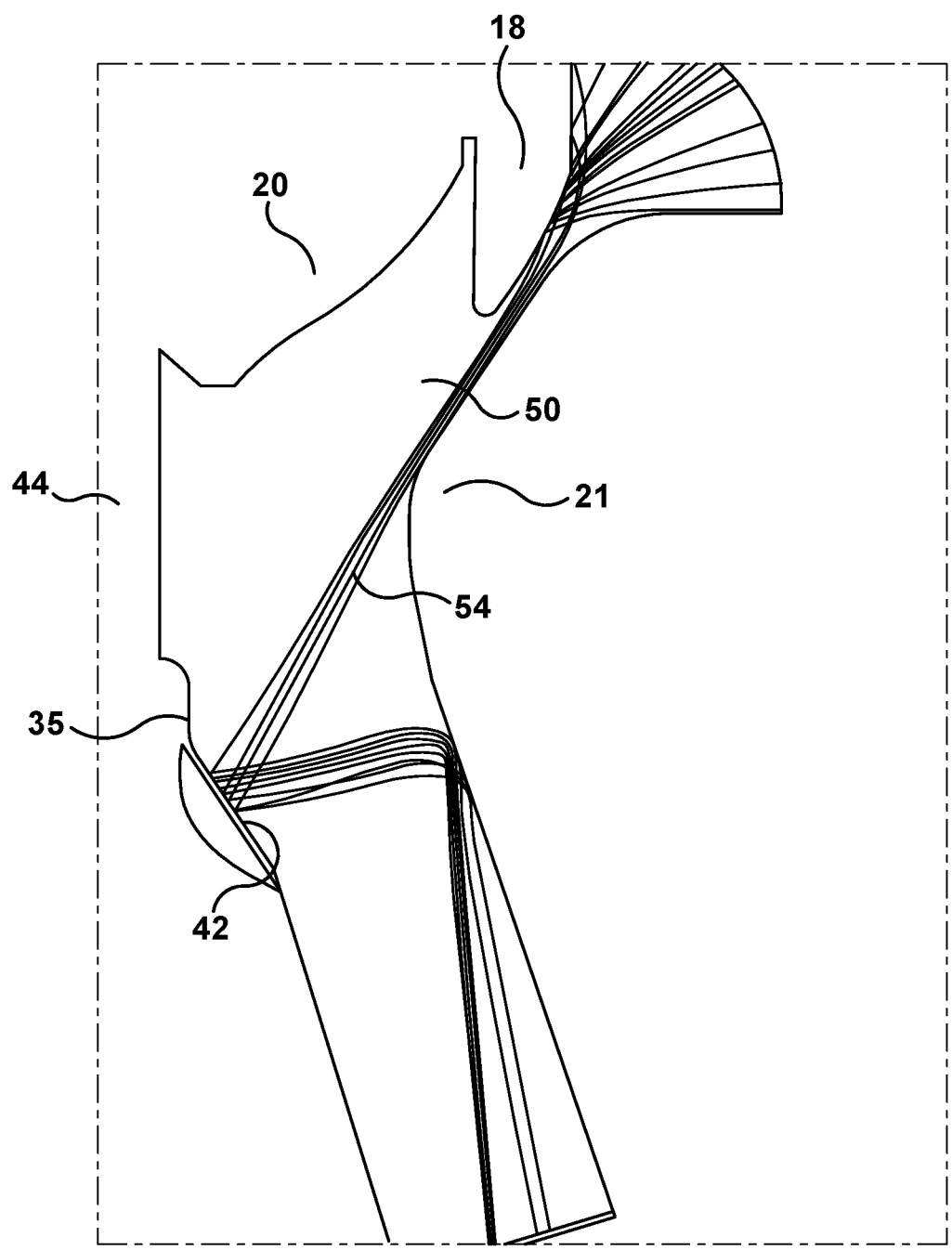
FIG. 3 is a schematic view of a cross-sectional portion of the steam valve of FIG. 2 showing the flow of air and particles passing therethrough.

In another exemplary embodiment, FIGS. 7 and 8 illustrate a nose piece 404 similar to the nose piece 104 of the pressure seal head 100 of FIG. 4 modified to include a wear indicator 410 to provide a means to notify an operator that the outer surface of the nose piece 404 has excessive erosion. The common features, therefore, will have the same reference number. The nose piece 404 may include at least one cavity 412 disposed within the tapered portion 112 where the nose piece may experience the greatest amount of erosion at area 42, as illustrated in FIG. 3. The cavity 412 may extend from the tip 414 of the nose piece 404 to at least the bottom of the tapered portion 120 of the nose piece 404. The cavity 412 is in fluid communication with an opening or slot 416 disposed in the inner surface of the lower portion 120 of the nose piece 404. The cavity 412 is spaced from the outer surface of the nose piece 400 to provide an inner wall 415 and an outer wall 415 having a desired outer wall thickness $t_1$, as best shown in FIG. 8. The thickness $t_1$ of the outer wall 414 is indicative of the amount of acceptable erosion for the specific area 42 (see FIGS. 2 and 3) on the nose piece 404. As shown, the thickness of the outer wall 414 of the nose piece 404 may be increasing greater as the cavity 412 extends downward. The invention further contemplates the thickness of the outer wall to remain constant over the tapered portion 122 of the nose piece 412, or the thickness of the outer wall over the tapered portion 122 decreasingly as the cavity 412 extends downward. Further, the thickness of the outer wall may vary depending on the erosion pattern on the nose piece 404. For example, the wall thickness may be greatest at the area 42 experiencing the most erosion. As best shown in FIG. 8, the cavity 412 further extends circumferentially about a portion of the nose piece 404, as shown, or completely around the entire circumference of the nose piece. In the embodiment shown in FIGS. 7 and 8, the nose piece 404 includes four cavities 412 evenly spaced, circumferentially around the nose piece 404, with each cavity in fluid communication with a respective slot 416. One will appreciate any number of cavities 412 may be disposed circumferentially within the nose piece 404. In one embodiment the spacing 420 between the cavities 412 is minimal to minimize the circumferential area void of the wear indicator. The cavities 412 may have different varying circumferential widths or the same circumferential widths. The wear indicator system 410 further includes a sensor (not shown) for measuring the pressure within the bore 128,106 and outside of surface 124 and 122 of the pressure seal head 100. When the outer wall 414 of the nose piece 404 erodes to the point of breaching any one of the cavities 412, the steam in the steam valve 10 flows into the cavity 412 to the bore 128,106 via the respective slot 416 in the fluid communication with a respective cavity 416. In response to the pressure change, a control system (not shown) provides an alarm or indicator to an operator that the nose piece 100 indicating the excessive erosion, and therefore, replacement of the nose piece 404 may be needed.

While the nose piece 104 may be modified to include the wear indicator 410, as shown in FIGS. 7 and 8, one will appreciate each of the nose pieces 204, 304 provided here before may include a similar excessive wear indicator 410 to determine the need to replace the nose piece 200 or the pressure seal head 300.

This invention will provide customers with added levels of protection from the long-term effects of solid particle erosion. The pressure seal head with this applied feature will have increased resistance to erosion and help prevent forced outages due to equipment failure.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pressure seal head of a steam valve, the pressure seal head comprising:
   an elongated body having a bore extending longitudinally through the body; and
   a nose piece extending from an end of the elongated body, the nose piece having at least a tapered end portion and a bore extending longitudinally therethrough and configured to longitudinally align with the bore of the elongated body;
   wherein the nose piece includes:
   a wear indicator having a plurality of cavities disposed circumferentially around the nose piece, an inner wall defined radially inward of the plurality of cavities, an outer wall defined radially outward of the plurality of cavities, and a plurality of spacings with each spacing being between each pair of adjacent cavities of the plurality of cavities, such that an alternating relationship of cavities and spacings define an entire circumference of the nose piece, each spacing of the plurality of spacings being circumferentially smaller than each cavity of the plurality of cavities; and
   a plurality of slots, each providing fluid communication between the bore of the nose piece and a respective cavity of the plurality of cavities;
   wherein the nose piece is formed of a first material having greater erosion resistance than a second material forming the elongated body.

2. The pressure seal head of claim 1, wherein the first material comprises at least one of a chromium alloy, a cobalt based alloy, a cobalt/chromium alloy, a tungsten alloy, and a titanium alloy.

3. The pressure seal head of claim 1, wherein the second material comprises a chromium alloy.

4. The pressure seal head of claim 1, wherein the nose piece integrally extends from the elongated body.

5. The pressure seal head of claim 1, wherein the nose piece is configured to be removably and replaceably attached to the elongated body.

6. The pressure seal head of claim 5, further comprising a pin configured to secure the nose piece and the elongated body together.

7. The pressure seal head of claim 5, wherein the nose piece and the elongated body are configured to thread together.

8. The pressure seal head of claim 5, wherein the elongated body and the nose piece are configured to snap fit together.

9. The pressure seal head of claim 8, further comprising a pin configured to secure the elongated body and the nose piece together.

10. The pressure seal head of claim 1, wherein the the plurality of cavities extend below a portion of the outer wall exposed to erosion.

11. The pressure seal head of claim 10, wherein each cavity of the plurality of cavities extends circumferentially around less than a quarter of the circumference of the nose piece; and wherein the plurality of cavities is four cavities.

12. A steam valve comprising:
   a housing defining a steam inlet and a steam outlet in fluid communication with a valve cavity;
   an annular valve seat disposed within the valve cavity;
   a control valve having a valve head coupled to a control valve stem, wherein control valve is configured to selectively engage the valve seat; and
   a stop valve including:
      a stop valve head;
      a stop valve stem coupled to the stop valve head, wherein the stop valve is configured to selectively engage the valve seat; and
      a pressure seal head configured to receive the stop valve stem including:
         an elongated body having a bore extending longitudinally through the body; and
         a nose piece extending from an end of the elongated body, the nose piece having at least a tapered end portion and a bore extending longitudinally therethrough and configured to longitudinally align with the bore of the elongated body;
         wherein the nose piece includes:
         a wear indicator having a plurality of cavities disposed circumferentially around the nose piece, an inner wall defined radially inward of the plurality of cavities, an outer wall defined radially outward of the plurality of cavities, and a plurality of spacings with each spacing being between each pair of adjacent cavities of the plurality of cavities, such that an alternating relationship of cavities and spacings define an entire circumference of the nose piece, each spacing of the plurality of spacings being circumferentially smaller than each cavity of the plurality of cavities; and
         a plurality of slots, each providing fluid communication between the bore of the nose piece and a respective cavity of the plurality of cavities;

wherein the nose piece is formed of a first material which has greater erosion resistance than a second material forming the elongated body.

13. A nose piece of a pressure seal head of a steam valve, the nose piece comprising:

at least a tapered end portion and a bore extending longitudinally therethrough and configured to longitudinally align with a bore of an elongated body of the pressure seal head;

wherein the nose piece includes:

a wear indicator having a plurality of cavities disposed circumferentially around the nose piece, an inner wall defined radially inward of the plurality of cavities, an outer wall defined radially outward of the plurality of cavities, and a plurality of spacings with each spacing being between each pair of adjacent cavities of the plurality of cavities, such that an alternating relationship of cavities and spacings define an entire circumference of the nose piece, each spacing of the plurality of spacings being circumferentially smaller than each cavity of the plurality of cavities; and a plurality of slots, each providing fluid communication between the bore of the nose piece and a respective cavity of the plurality of cavities;

wherein the nose piece is formed of a first material having greater erosion resistance than a second material forming the elongated body.

14. The nose piece of claim 13, wherein the nose piece is configured to removably and replaceably attach to the elongated body of the pressure seal head.

15. The nose piece of claim 13, wherein the plurality of cavities extend below a portion of the outer wall exposed to erosion.

\* \* \* \* \*